United States Patent
Buisson et al.

(10) Patent No.: US 9,547,312 B2
(45) Date of Patent: Jan. 17, 2017

(54) METHOD AND DEVICE FOR OPTIMIZING THE LANDING OF AN AIRCRAFT ON A RUNWAY

(71) Applicant: Airbus Operations (SAS), Toulouse (FR)

(72) Inventors: Alexandre Buisson, Toulouse (FR); Benjamin Tessier, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 4 days.

(21) Appl. No.: 14/599,649

(22) Filed: Jan. 19, 2015

(65) Prior Publication Data

US 2015/0205302 A1     Jul. 23, 2015

(30) Foreign Application Priority Data

Jan. 23, 2014  (FR) ...................................... 14 50587

(51) Int. Cl.
| | | |
|---|---|---|
| *G05D 1/10* | (2006.01) | |
| *G05D 1/04* | (2006.01) | |
| *G05D 1/06* | (2006.01) | |
| *G05D 1/08* | (2006.01) | |
| *G08G 5/02* | (2006.01) | |
| *G08G 5/00* | (2006.01) | |

(52) U.S. Cl.
CPC .............. *G05D 1/101* (2013.01); *G05D 1/042* (2013.01); *G05D 1/0676* (2013.01); *G05D 1/0808* (2013.01); *G08G 5/0021* (2013.01); *G08G 5/025* (2013.01); *Y02T 50/84* (2013.01)

(58) Field of Classification Search
CPC ....... G05D 1/101; G05D 1/042; G05D 1/0676
See application file for complete search history.

(56) References Cited

U.S. PATENT DOCUMENTS

| | | | |
|---|---|---|---|
| 8,374,736 B1 * | 2/2013 | Rupnik | ................. G08G 5/025 701/17 |
| 2008/0269966 A1 | 10/2008 | Markiton et al. | |
| 2012/0232725 A1 * | 9/2012 | Dumoulin | ............ G05D 1/0676 701/18 |

FOREIGN PATENT DOCUMENTS

| | | |
|---|---|---|
| EP | 1971974 | 9/2008 |
| FR | 2972541 | 9/2012 |

OTHER PUBLICATIONS

French Search Report, Nov. 6, 2014.

* cited by examiner

*Primary Examiner* — Basil T Jos
(74) *Attorney, Agent, or Firm* — Greer, Burns & Crain, Ltd.

(57) ABSTRACT

A guiding unit and a computation unit, the computation unit comprising elements for saturating, if necessary, a usual optimized slope for the landing, following a comparison with a slope computed on the basis of a performance criterion relative to a deceleration capability of the aircraft.

15 Claims, 2 Drawing Sheets

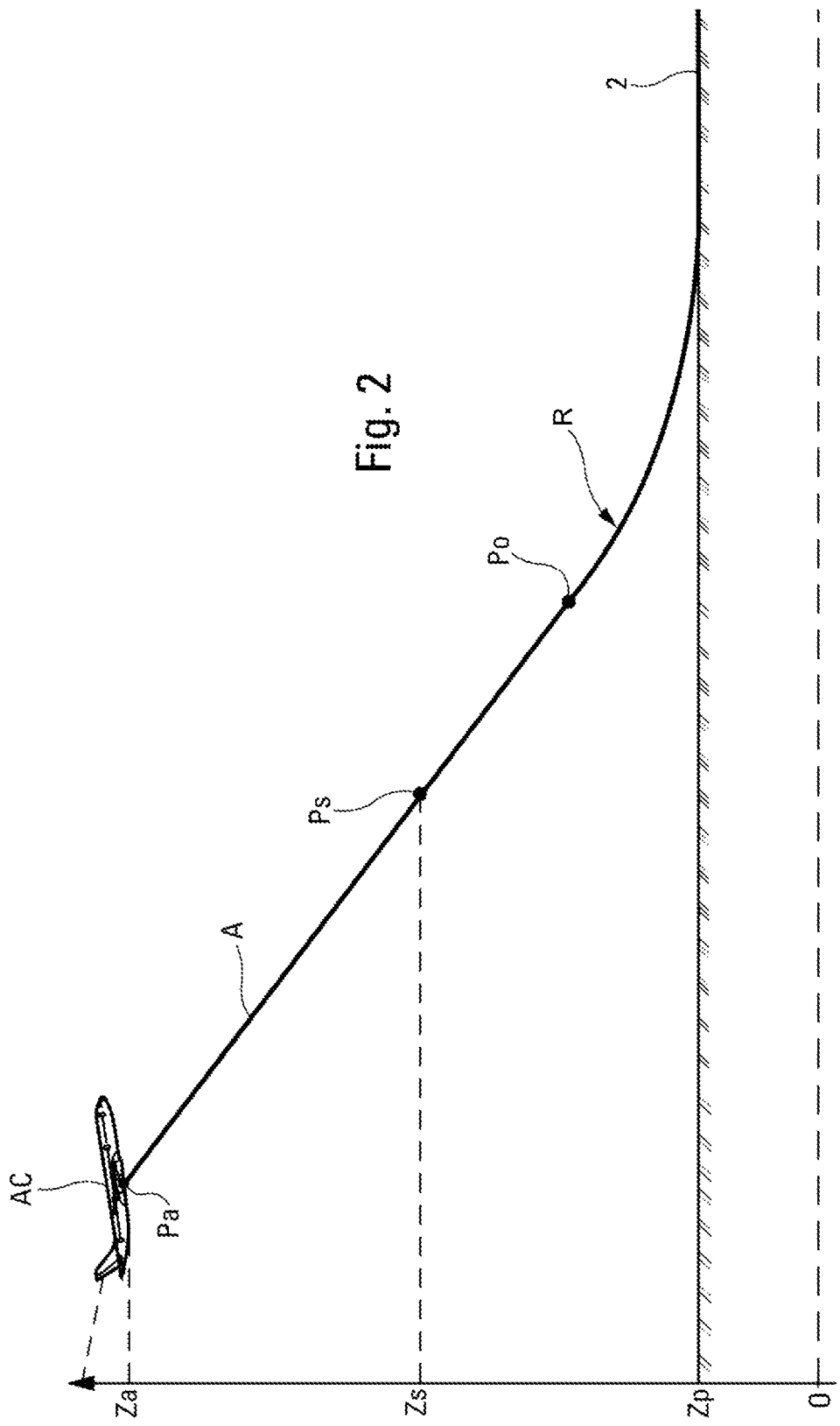

METHOD AND DEVICE FOR OPTIMIZING THE LANDING OF AN AIRCRAFT ON A RUNWAY

CROSS-REFERENCES TO RELATED APPLICATIONS

This application claims the benefit of the French patent application No. 1450587 filed on Jan. 23, 2014, the entire disclosures of which are incorporated herein by way of reference.

BACKGROUND OF THE INVENTION

The present invention relates to a method for optimizing the landing of an aircraft on a runway, and a corresponding optimization device.

The present invention applies to a method for computing an optimal final slope for the landing of an aircraft, of "A-IGS" (Adaptive Increased Glide Slope) type.

From the documents US-2012/0232725 and FR-2 972 541, the disclosures of which are incorporated herein by reference, a method and a device are known for optimizing the landing of an aircraft on a runway, said landing comprising an approach phase, defined by an approach axis to be followed with which is associated a predefined ground slope and a flare phase. This usual method is such that:

in a preliminary step:
from performance levels and characteristics specific to said aircraft, a target vertical speed is defined relative to the ground which is to be applied to said aircraft on initiation of the flare phase; and
an optimized ground speed is determined, as a function of said target vertical speed and of at least one outside parameter, associated with the approach axis, which is greater than or equal to the predefined ground slope, and
upon interception, by the aircraft, of the approach axis, said aircraft is guided so that it follows the determined optimized ground slope, associated with said approach axis, and that it reaches the target vertical speed previously defined on initiation of the flare phase.

Thus, by this known method, the ground slope of the approach axis is optimized (relative to the ground slope published in the standard operating procedure) from a target vertical speed predefined using characteristics specific to the aircraft. By setting the ground vertical speed of the aircraft on initiation of the flare (at approximately 50 feet) to a previously defined nominal target value, this usual method makes it possible to secure the final approach phase by proposing a more constant, repetitive and easy flare, while increasing the slope by exploiting the conditions of the approach concerned with improving the environmental aspects, without imposing operational constraints.

Energy management on approach depends greatly on factors specific or external to the aircraft influencing the deceleration capabilities of the aircraft. In particular, the weight of the aircraft and the weather conditions are factors which influence the deceleration capability. Particular attention on the part of the crews is required with respect to the monitoring of the flight parameters and, if necessary, the application of corrective actions such as early extension of the high lift flaps of the gear and/or use of the air brakes.

However, the deceleration management can be made more difficult when the slopes are increased, for example for obstacle avoidance considerations.

Similarly, the increased slope proposed by the computation of the optimized slope, of A-IGS type, which is based solely on the final approach speed and the target vertical speed, can, in certain cases, result in approaches being flown that are too steep, which would increase the risk of non-stabilized approach.

SUMMARY OF THE INVENTION

An object of the present invention is to remedy this drawback. It relates to a method for optimizing the landing of an aircraft on a runway, that makes it possible to additionally ensure that a proposed slope is actually flyable by the aircraft.

To this end, according to the invention, said method for optimizing the landing of an aircraft on a runway, said landing comprising an approach phase defined by an approach axis to be followed and a flare phase, said method comprising:

A) in a first step of:
defining, from performance levels and characteristics specific to said aircraft, a target vertical speed relative to the ground to be applied to said aircraft on initiation of the flare phase; and
determining, as a function of said target vertical speed, an optimized slope, associated with the approach axis; and
B) in a second step, upon interception by the aircraft of the approach axis, of guiding said aircraft so that it follows a slope determined in the first step, associated with said approach axis, and that it reaches the target vertical speed previously defined on initiation of the flare phase.

It is noteworthy in that the invention further comprises, additionally in the first step, substeps comprising:
a) determining a limit slope dependent on a performance criterion relative to a deceleration capability of the aircraft, said limit slope being flyable by the aircraft;
b) comparing the optimized slope to said limit slope; and
c) selecting the lower slope out of the optimized slope and the limit slope, the aircraft being guided in the step B) so that it follows the duly selected slope called a final slope.

Thus, by virtue of the invention, provision is made to saturate, if necessary, the usual optimized slope, preferably of A-IGS type, following a comparison with a maximum slope (called a limit slope) which is computed on the basis of a performance criterion relative to a deceleration capability of the aircraft. In effect, if the optimized slope is greater than the limit slope (and only in this case), the aircraft is guided according to the latter which is (by definition) flyable, that is to say which is defined in such a way as to be able to be followed by the aircraft as a function notably of its capabilities, and in particular of its deceleration capabilities. This makes it possible to ensure that the aircraft is able to fly along the slope supplied, with its deceleration capabilities.

In the context of the present invention, the slopes are considered with the following convention:
a stronger (greater or higher) slope signifies a more negative, or even steeper, slope;
conversely, a lower slope is a less negative, or even lower slope; and
when the type is not specified, the term slope represents a geometrical slope.

In a preferred embodiment, the substep a) comprises:
determining a first auxiliary slope from a first performance criterion;
determining a second auxiliary slope from a second performance criterion; and
determining, as the limit slope, the lower slope out of said first and second auxiliary slopes.

In this preferred embodiment, the first auxiliary slope is computed, from a performance model, so as to guarantee a zero acceleration with the landing gear raised in the aircraft and in an intermediate aerodynamic configuration with its landing configuration, upon intercepting the approach axis.

Furthermore, advantageously, the computation of the second auxiliary slope comprises the following operations, comprising:
computing a slope for a zero acceleration;
computing a slope deviation that satisfies a deceleration objective; and
subtracting the slope deviation from the slope computed for a zero acceleration so as to obtain said second auxiliary slope.

Furthermore, advantageously:
the substep a) comprises an additional operation comprising determining only a second auxiliary slope in the case of a stabilized approach; and
the substep a) comprises an additional operation comprising, for the computation of the first auxiliary slope relative to the first performance criterion, a speed value imposed by an air traffic controller upon intercepting the approach axis.

Moreover, the optimization method can have the following characteristics, taken individually or in combination:
the substep a) comprises performing a balance computation based on equations of the mechanics of the flight of the aircraft by considering an idling engine speed of the aircraft and a target speed, so as to compute, as the limit slope, using a performance model of the aircraft and outside conditions identified during the flight, the slope that makes it possible to maintain the target speed. Preferably, the outside conditions comprise at least one of the following parameters: temperature, wind, altitude;
the final slope lies within a range of values comprising at least one lower extreme value, and, possibly, an upper extreme value;
the substep a) comprises an additional operation comprising multiplying, by a coefficient, a measured wind value, before using it for a slope computation, said wind value being multiplied by a first coefficient less than 1 if the wind concerned is a head wind relative to the aircraft and by a second coefficient greater than 1 if the wind concerned is a tail wind relative to the aircraft;
the substep a) comprises an additional operation comprising using, as wind, for a slope computation:
if the only wind available is a measured wind for a given altitude, this sole available wind; and
if a wind determined on the final approach slope is available, the latter available wind; and
the substep a) comprises an additional operation comprising using, as capture altitude of the approach axis for a slope computation, an altitude defined by an air traffic controller.

The present invention relates also to a device for optimizing the landing of an aircraft on a runway, said landing comprising an approach phase, defined by an approach axis to be followed with which is associated a predefined slope, and a flare phase.

According to the invention, said device is of the type comprising:
a computation unit configured to determine, as a function of a target vertical speed previously defined from performance and characteristics specific to said aircraft, at least one optimized slope associated with the approach axis to be followed; and
a guiding unit configured to guide the aircraft from the interception by the latter of the approach axis, in order for it to follow a slope associated with said approach axis and determined by the computation unit, and for it to reach the target vertical speed previously defined on initiation of the flare phase.

The computation unit comprises:
a computation unit configured to determine a limit slope dependent on a performance criterion relative to a deceleration capability of the aircraft, said limit slope being flyable by the aircraft;
a comparison element configured to compare the optimized slope to said limit slope; and
a selection element configured to select the lower slope out of the optimized slope and the limit slope, the aircraft being guided by the guiding unit for it to follow the duly selected slope.

Furthermore, advantageously, the computation element comprises:
a first element configured to determine a first auxiliary slope from a first performance criterion;
a second element configured to determine a second auxiliary slope from a second performance criterion; and
a third element configured to determine, as limit slope, the lower slope out of said first and second auxiliary slopes.

Moreover, the present invention relates also to an aircraft, in particular a transport airplane, which comprises a device such as that specified above.

BRIEF DESCRIPTION OF THE DRAWINGS

The figures of the attached drawing will give a good understanding as to how the invention can be produced. In these figures, identical references denote similar elements.

FIG. 2 represents a diagram illustrating a landing of an aircraft equipped with a landing optimization device.

DETAILED DESCRIPTION OF THE PREFERRED EMBODIMENTS

Figure 1:
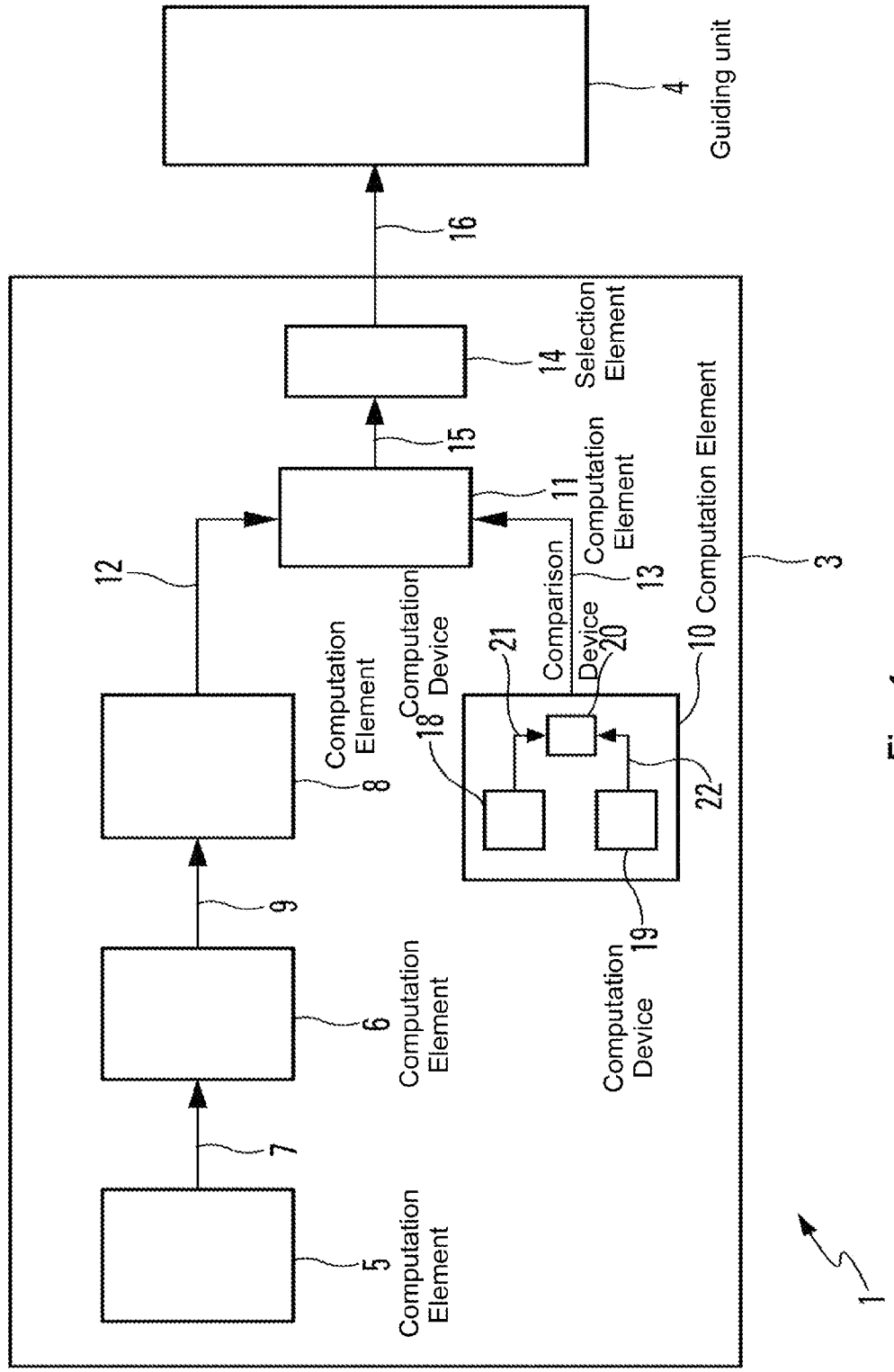
FIG. 1 is a block diagram of an optimization device illustrating the invention.

The aim of the device 1 illustrating the invention and represented in a particular embodiment in FIG. 1 is to optimize the landing of an aircraft AC on a (landing) runway 2 of an airport, by computing and following a suitable and augmented final approach slope.

Usually, the landing on the (landing) runway 2 comprises an approach phase, defined by an approach axis A to be followed by the aircraft AC, and a flare phase R, as represented in FIG. 2.

There are two types of approach for a landing, namely stabilized approaches and decelerated approaches. More specifically:

A) the stabilized approaches require the aircraft AC to be stabilized in its final landing configuration at the point of interception of the final approach slope, namely with the landing gear lowered, the high lift systems (slats and flaps) in the landing configuration and at a final approach speed. These parameters are kept constant as far as the threshold of the runway 2; and B) the decelerated approaches require the aircraft AC to be stabilized in its final landing configuration at the latest at a given height above a reference point of the runway 2 concerned, generally between 1000 feet and 500 feet depending on the weather conditions requiring flight by instruments or allowing flight by sight. In a usual decelerated approach, the aircraft AC begins its deceleration before the point of interception of the final approach slope (generally at an altitude situated between 3000 and 5000 feet above the runway 2) and intercepts the final approach slope in an intermediate aerodynamic configuration. The deceleration to the final approach speed, the final extension of the high lift systems and of the landing gear are therefore conducted on the final approach slope. These parameters are then maintained constantly from the minimum height of 1000 feet or 500 feet to the runway threshold 2.

The choice of whether to perform a stabilized approach or a decelerated approach depends generally on local constraints (published approach types), on air traffic control constraints (imposed speed), on the capabilities of the aircraft AC and on a policy of the airline.

In the situation represented schematically in FIG. 2, the aircraft AC, in particular a transport airplane, is in approach phase about to land on the runway 2 situated at an altitude Zp. After a flight on an approach level of altitude Za or after an intermediate approach by continuous descent, the aircraft AC intercepts a final approach axis A, having an optimized slope $\gamma_{perf}$ determined in the manner described hereinbelow, at a point Pa (which corresponds to the intersection of the level Za, or of the segment of the continuous descent approach, and of the approach axis A and descends along said axis A towards the runway 2 to decelerate to a stabilized approach speed at a stabilization altitude Zs at approximately 1000 feet (point Ps) to then reach a target vertical speed Vzo relative to the ground that is constant at a point Po. This final point marks the start of the flare R which follows the approach phase.

For this, the device 1 comprises:
a computation unit 3 configured to determine, as a function of at least one outside parameter and of the target vertical speed Vzo previously defined from performance levels and characteristics specific to said aircraft AC, at least one optimized slope $\gamma_o$ associated with the approach axis A to be followed; and
a guiding unit 4 configured to guide the aircraft AC from the interception (point Pa) by the latter of the approach axis A, in order for it to follow a slope associated with said approach axis A and determined by the computation unit 3, as specified below, and for it to reach the target vertical speed previously defined Vzo on initiation of the flare phase.

In a particular embodiment, the outside parameter or parameters used by the computation unit 3 to determine the optimized slope $\gamma_o$ belong to the following group:
the conventional air speed (CAS) of the aircraft AC;
the outside temperature at a standard height;
the horizontal wind speed;
any inclination of the runway 2 relative to the horizontal; and
the pressure altitude of the runway 2.

Usually, the computation unit 3 comprises, as represented in FIG. 1:
a computation element 5 configured to compute the density of the air at a standard height ho (point Po). For this, it receives the outside temperature and the pressure altitude of the runway 2. The computation element 5 is able to deliver, at the output, the density of the air at the height ho;
a computation element 6 configured to compute the true air speed TAS of the aircraft AC. For this, it receives the density of the air determined by the computation element 5 (via a link 7) and the corrected air speed CAS. The computation element 6 is able to deliver, at the output, the true air speed TAS; and
a computation element 8 configured to compute the optimized slope $\gamma_o$. It receives the true air speed TAS determined by the computation element 6 (via a link 9), the target vertical speed Vzo, the horizontal wind speed, and the inclination of the runway 2. It is able to deliver, at the output, the optimized slope $\gamma_o$.

Moreover, according to the invention, said computation unit 3 comprises, in addition, as represented in FIG. 1:
a computation element 10 configured to determine, as specified below, a limit slope $\gamma_1$ dependent on a performance criterion relative to a deceleration capability of the aircraft AC, the limit slope $\gamma_1$ being flyable by the aircraft AC;
a comparison element 11 linked via links 12 and 13, respectively, to the computation elements 8 and 10 and configured to compare the optimized slope $\gamma_o$ (received from the computation element 8) to said limit slope $\gamma_1$ (received from the computation element 10); and
a selection element 14 linked via a link 15 to said comparison element 11 and configured to select the lower slope out of the optimized slope $\gamma_o$ and the limit slope $\gamma_1$, the aircraft AC being guided by the guiding unit 4 configured to cause the aircraft AC to follow the duly selected slope (indicated $\gamma_{perf}$).

For this, the guiding unit 4 comprises the following usual devices known to one skilled in the art (not separately represented in the figures):
an auxiliary computation device which is configured to determine, in the usual manner, piloting setpoints, from information received from the computation unit 3 (and notably from the selection element 14) via the link 16, in particular the slope selected by the selection element 14;
at least one piloting aid device, for example an automatic piloting device and/or a flight director, which is configured to determine, from the piloting setpoints received from said auxiliary computation device, instructions for piloting the aircraft AC; and
elements configured to actuate controlled members, such as, for example, control surfaces (for direction, depth, etc.) of the aircraft AC, to which the duly determined piloting instructions are applied.

In the context of the present invention, the (descent) slopes are considered with the following convention:
a stronger (greater or higher) slope signifies a more negative, or even steeper, slope;
conversely, a lower slope is a less negative, or even less steep, slope; and
when the type is not specified, the term slope represents a geometrical slope.

Thus, by virtue of the invention, provision is made to saturate, if necessary, the optimized usual slope $\gamma_o$, preferably of A-IGS type, following a comparison with a limit slope $\gamma_1$ (maximum) computed on the basis of a performance criterion relative to a deceleration capability of the aircraft. In effect, if the optimized slope $\gamma_o$ is greater than the limit slope $\gamma_1$ (and only in this case), the aircraft AC is guided according to the latter. By definition, this limit slope $\gamma_1$ is flyable, that is to say that it is defined in such a way as to be able to be followed by the aircraft AC as a function notably of its capabilities, and in particular of its deceleration capabilities dependent on the weight of the aircraft AC and on the weather conditions. This makes it possible to ensure that the aircraft AC is able to fly along the slope supplied by the computation unit 3 with its deceleration capabilities.

The computation unit 3 can be an integral part of a flight management system, of FMS type, of the aircraft AC or of another onboard system linked with the flight management system. As a variant, it can be external to the aircraft AC and take the form of a portable computer or even be incorporated in a ground station capable of communicating the slope to the aircraft AC.

The computation unit 3 performs a balance computation based on equations of the mechanics of the flight of the aircraft AC by considering an idling engine speed of the aircraft AC and a target conventional speed, so as to compute, as limit slope, using a usual performance model of the aircraft AC and outside conditions identified during the flight, the slope that makes it possible to maintain the target conventional speed. Preferably, the outside conditions comprise at least one of the following conditions: temperature, wind, altitude.

In a preferred embodiment, the computation element 10 of the computation unit 3 comprises, as represented in FIG. 1:
- a computation device 18 configured to determine a first auxiliary slope $\gamma_{C1}$ from a first performance criterion C1;
- a computation device 19 configured to determine a second auxiliary slope $\gamma_{C2}$ from a second performance criterion C2; and
- a comparison device 20 which is linked via links 21 and 22, respectively, to the computation means 18 and 19 and which is configured to determine, as limit slope $\gamma_1$, the lower slope out of said first auxiliary slope $\gamma_{C1}$ and said second auxiliary slope $\gamma_{C2}$.

The lower of the slopes of $\gamma_{C1}$ and $\gamma_{C2}$ is therefore then compared by the comparison element 11 to the optimized slope $\gamma_o$. A saturation is applied if the deceleration-limited maximum slope is lower than the optimized slope $\gamma_o$. A slope $\gamma_{perf}$ is thus obtained which is such that:

$$\gamma_{perf} = \min(\gamma_o, \min(\gamma_{C1}, \gamma_{C2}))$$

The saturation of the optimized slope $\gamma_o$ performed according to the invention makes it possible to contain the acceleration.

Each of the two performance criteria C1 and C2 is representative of the state of the aircraft AC and of the outside conditions as a function of the position of the aircraft AC on the final approach slope (approach axis A). Depending on the criterion C1 or C2 considered, a correction is applied to take into account a deceleration objective.

In the abovementioned preferred embodiment, the computation device 18 is configured to compute the first auxiliary slope $\gamma_{C1}$, from a performance model, so as to guarantee a zero acceleration with the landing gear raised in the aircraft AC and in an intermediate aerodynamic configuration, upon intercepting the approach axis A.

With regard to the criterion C1, for operational reasons, the final approach slope should not at any time lead to an acceleration of the aircraft AC requiring corrective actions from the crew. At the start of the final approach slope, the altitude still being relatively great (between 3000 feet and 5000 feet), a zero acceleration is sufficient. It is the ongoing sequencing of the extension of the high lift systems and of the lowering of the landing gear performed at the discretion of the pilots (generally the pilots follow the rules of SOP (Standard Operating Practices) type put in place by the constructors), which triggers the final deceleration phase to stabilize the aircraft AC in its final approach configuration at the final approach speed. The auxiliary slope $\gamma_{C1}$ obtained for the criterion C1, is therefore computed in such a way as to guarantee a zero acceleration with the landing gear raised and in intermediate configuration upon intercepting the final approach slope.

Furthermore, the computation device 19 is configured to compute the second auxiliary slope $\gamma_{C2}$ by implementing the following successive operations:
- computing a slope for a zero acceleration;
- computing a slope deviation that satisfies a deceleration objective; and
- subtracting the slope deviation from the slope for a zero acceleration so as to obtain said second auxiliary slope $\gamma_{C2}$.

With regard to the criterion C2, as the aircraft AC advances on the final approach slope (axis A), a deceleration objective is necessary to enable it to reach the final approach speed. As an illustration, this objective can be set at −0.4 knots per second. This deceleration value corresponds generally to the minimum value for a pilot to perceive a deceleration on a usual speed indicator of the aircraft AC. The slope obtained with the balance computation for the criterion C2 is therefore corrected to satisfy the deceleration objective. The deceleration objective, for example of −0.4 knots per second, is translated into a slope deviation which is subtracted from the slope obtained with zero acceleration to finally obtain the auxiliary slope $\gamma_{C2}$.

Moreover, the final slope (used by the guiding unit 4) must lie within a range of acceptable slopes. In effect, the final slope cannot be lower than the slope published in the approach procedure of the airport concerned. Depending on the certification or not of an aircraft AC to be able to perform steep approaches, the final slope is also limited to a maximum value, generally −4.49° if the aircraft AC is not certified. Also, in a preferred embodiment, the slope transmitted by the computation unit 3 and followed by the guiding unit 4 corresponds:
- to the maximum slope out of the slope $\gamma_{perf}$ and the published slope, for an aircraft AC certified for the steep approaches; and
- to the minimum slope out of the preceding maximum slope and the abovementioned maximum value, preferably −4.49°, for an aircraft AC not certified for the steep approaches.

Moreover, a number of variants are envisaged to optimize the implementation of the invention and best adapt it to the operational context.

In a particular embodiment, the computation unit 3 (and notably the computation element 10) implements an additional operation comprising multiplying, by a coefficient, a measured wind value, before using it for a slope computation. The wind value is multiplied by a first coefficient less than 1 (for example 0.5) if the wind concerned is a head wind relative to the aircraft AC and by a second coefficient greater than 1 (for example 1.5) if the wind concerned is a tail wind relative to the aircraft AC.

Furthermore, in a particular embodiment:
- the computation unit 3 uses as wind, for a slope computation, if the only wind available is a measured wind for a given altitude, this sole available wind. Generally, only the wind measured at a height of approximately 10 meters is communicated to the aircraft by air traffic control; and
- if the device 1 comprises a device for determining the wind at altitude on the final approach slope, this information will replace the values considered for the two performance criteria C1 and C2 of the deceleration capability.

Moreover, usually, the altitude used is generally extracted from a navigation database onboard the aircraft AC and used by the flight management system. Furthermore, depending on the operational context, air traffic control may require the aircraft to capture the final approach slope at different altitudes for one and the same runway 2 concerned. In such a situation, the computation unit 3 takes into account the altitude defined by air traffic control, notably for the computation relating to the criterion C1.

Moreover, a number of situations may require a stabilized approach to be performed. A low value of the capture altitude of the final approach slope (operational case imposed by air traffic control), and published approaches with steep slopes (from −3.5° and up to −4.49° for the conventional approaches) are two examples thereof.

In this case, provision is made for the computation element 10 not to consider the criterion C1 and to retain only the criterion C2.

Moreover, in airports with high traffic densities, it is common practice for air traffic control to require speeds to be maintained up to a given distance (in the region of 4 to 6 NM) from the threshold of the runway 2 in order to optimize the traffic capacity of the approaches and their sequencing with departures. Also, the computation means 18 can take account of this speed value for the criterion C1.

The optimization device 1, such as described above, also offers the advantage of being able to be implemented:
- easily in any aircraft AC;
- without structural modification of the aircraft AC;
- without modification of the aerodynamic configuration of the aircraft;
- without modification of the operational procedures;
- without modification of the airport infrastructures on the ground; and
- without additional certification specific to this concept.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for optimizing the landing of an aircraft on a runway, said landing comprising an approach phase defined by an approach axis to be followed and a flare phase, said method comprising the steps:
in a first step:
defining, from performance levels and characteristics specific to said aircraft, a target vertical speed relative to the ground, to be applied to said aircraft on initiation of the flare phase; and
determining, as a function of said target vertical speed, an optimized slope, associated with the approach axis; and
in a second step, upon interception by the aircraft of the approach axis, in guiding said aircraft so that the aircraft follows the optimized slope determined in the first step, associated with said approach axis, and that the aircraft reaches the target vertical speed previously defined on initiation of the flare phase,
additionally in the first step, substeps comprising:
determining a limit slope based on a performance criterion related to a deceleration capability of the aircraft, said limit slope being flyable by the aircraft as a function of the deceleration capability related to a weight of the aircraft and a weather condition;
comparing the optimized slope with said limit slope;
selecting a lower slope from the optimized slope and the limit slope based on the comparison; and
guiding the aircraft based on the selected lower slope in the second step so that the aircraft follows the selected lower slope as a final slope of the aircraft during the flare phase of the landing.

2. The method according to claim 1, wherein the determining substep comprises performing a balance computation based on equations of the mechanics of the flight of the aircraft by considering an idling engine speed of the aircraft and a target speed, so as to compute, as the limit slope, using a performance model of the aircraft and outside conditions identified during the flight, the optimized slope for maintaining the target speed.

3. The method according to claim 2, wherein the outside conditions comprise at least one of the following parameters: temperature, wind, and altitude.

4. The method according to claim 1, wherein the determining substep comprises:
determining a first auxiliary slope from a first performance criterion;
determining a second auxiliary slope from a second performance criterion; and
determining, as the limit slope, the lower slope from said first and second auxiliary slopes.

5. The method according to claim 4, wherein the first auxiliary slope is computed, from a performance model, so as to guarantee a zero acceleration with the landing gear raised in the aircraft and in an intermediate aerodynamic configuration, upon intercepting the approach axis.

6. The method according to claim 4, wherein the computation of the second auxiliary slope comprises the following operations:
computing a slope for a zero acceleration;
computing a slope deviation that satisfies a deceleration objective; and
subtracting the slope deviation from the slope computed for a zero acceleration so as to obtain said second auxiliary slope.

7. The method according to claim 4, wherein the determining substep comprises an additional operation of determining only a second auxiliary slope in the case of a stabilized approach.

8. The method according to claim 4, wherein the determining substep comprises an additional operation of using, for the computation of the first auxiliary slope relative to the first performance criterion, a speed value imposed by an air traffic controller upon intercepting the approach axis.

9. The method according to claim 1, wherein the final slope lies within a range of values comprising at least one lower extreme value.

10. The method according to claim 1, wherein at least the determining substep comprises an additional operation of multiplying, by a coefficient, a measured wind value, before using the measured wind value for a slope computation, said wind value being multiplied by a first coefficient less than 1 if the wind concerned is a head wind relative to the aircraft and by a second coefficient greater than 1 if the wind concerned is a tail wind relative to the aircraft.

11. The method according to claim 1, wherein the determining substep comprises an additional operation of, as wind, for a slope computation:
if the only wind available is a measured wind for a given altitude, this sole available wind; and if a wind determined on the final approach slope is available, the latter available wind.

12. The method according to claim 1, wherein the determining substep comprises an additional operation of, as capture altitude of the approach axis for a slope computation, an altitude defined by an air traffic controller.

13. A device for optimizing the landing of an aircraft on a runway, said landing comprising an approach phase defined by an approach axis to be followed and a flare phase, said device comprising:
   a computation unit configured to determine, as a function of a target vertical speed previously defined from performance and characteristics specific to said aircraft, at least one optimized slope associated with the approach axis to be followed; and
   a guiding unit configured to guide the aircraft from the interception by the latter of the approach axis, in order for the aircraft to follow the optimized slope associated with said approach axis and determined by the computation unit, and for the aircraft to reach the target vertical speed previously defined on initiation of the flare phase,
   said computation unit comprising:
   a computation element configured to determine a limit slope based on a performance criterion related to a deceleration capability of the aircraft, said limit slope being flyable by the aircraft as a function of the deceleration capability related to a weight of the aircraft and a weather condition;
   a comparison element configured to compare the optimized slope with said limit slope; and
   a selection element configured to select a lower slope from the optimized slope and the limit slope based on the comparison, the aircraft being guided by the guiding unit to follow the selected slope based on the selected lower slope as a final slope of the aircraft during the flare phase of the landing.

14. The device according to claim 13, wherein the computation element comprises:
   a first element configured to determine a first auxiliary slope from a first performance criterion;
   a second element configured to determine a second auxiliary slope from a second performance criterion; and
   a third element configured to determine, as the limit slope, the lower slope from said first and second auxiliary slopes.

15. An aircraft comprising a device for optimizing the landing of an aircraft on a runway, said landing comprising an approach phase defined by an approach axis to be followed and a flare phase, said device comprising:
   a computation unit configured to determine, as a function of a target vertical speed previously defined from performance and characteristics specific to said aircraft, at least one optimized slope associated with the approach axis to be followed; and
   a guiding unit configured to guide the aircraft from the interception by the latter of the approach axis, in order for the aircraft to follow the optimized slope associated with said approach axis and determined by the computation unit, and for the aircraft to reach the target vertical speed previously defined on initiation of the flare phase,
   said computation unit comprising:
   a computation element configured to determine a limit slope based on a performance criterion related to a deceleration capability of the aircraft, said limit slope being flyable by the aircraft as a function of the deceleration capability related to a weight of the aircraft and a weather condition;
   a comparison element configured to compare the optimized slope with said limit slope; and
   a selection element configured to select a lower slope from the optimized slope and the limit slope based on the comparison, the aircraft being guided by the guiding unit to follow the selected slope based on the selected lower slope as a final slope of the aircraft during the flare phase of the landing.

* * * * *